United States Patent
Lüthi et al.

[11] Patent Number: 5,363,685
[45] Date of Patent: Nov. 15, 1994

[54] TRANSFER DEVICE IN A PRESS

[75] Inventors: Rudolf Lüthi, Niederwangen; Roland Krebs, Fraubrunnen; Theo Egolf, Boesingen, all of Switzerland

[73] Assignee: Styner & Bienz AG, Niederwangen, Switzerland

[21] Appl. No.: 112,301

[22] Filed: Aug. 27, 1993

Related U.S. Application Data

[63] Continuation of Ser. No. 804,363, Dec. 10, 1991, abandoned.

[30] Foreign Application Priority Data

Dec. 11, 1990 [CH] Switzerland ............... 03 917/90-9

[51] Int. Cl.$^5$ ............................................. B21J 13/10
[52] U.S. Cl. ................................... 72/405; 198/740; 198/741; 414/751; 100/207; 100/216
[58] Field of Search ............... 414/751, 749, 225; 198/740, 741; 72/405, 419, 420, 404; 100/207, 216

[56] References Cited

U.S. PATENT DOCUMENTS

| | | |
|---|---|---|
| 3,077,259 | 2/1963 | Braun . |
| 4,012,937 | 3/1977 | Imanishi ................. 72/419 |
| 4,032,018 | 6/1977 | Wallis . |
| 4,540,087 | 9/1985 | Mizumoto . |
| 4,735,303 | 4/1988 | Wallis .............. 414/751 X |
| 4,833,908 | 5/1989 | Sofy ....................... 72/405 |
| 4,852,381 | 8/1989 | Sofy ....................... 72/405 |
| 4,966,274 | 10/1990 | Willenbrock et al. ......... 414/751 X |

FOREIGN PATENT DOCUMENTS

| | | |
|---|---|---|
| 2332125 | 6/1977 | France . |
| 3329900 | 2/1984 | Germany . |

*Primary Examiner*—Donald W. Underwood
*Attorney, Agent, or Firm*—Marks & Murase

[57] ABSTRACT

Workpieces are transported step-by-step by means of transport bars which are provided with grippers and which are longitudinally and transversally displaceable only in cyclic relation to the reciprocating movement of a press. The transport bars have the configuration of hollow profiles which are rigid with respect to bending and torsional stresses, and their ends are rigidly constrained and guided by means of angle brackets and by means of longitudinal guidings and transversal guidings both of which are free of play. Thus, a particularly rigid and a relatively lightweight construction results which allows high working cadences.

9 Claims, 3 Drawing Sheets

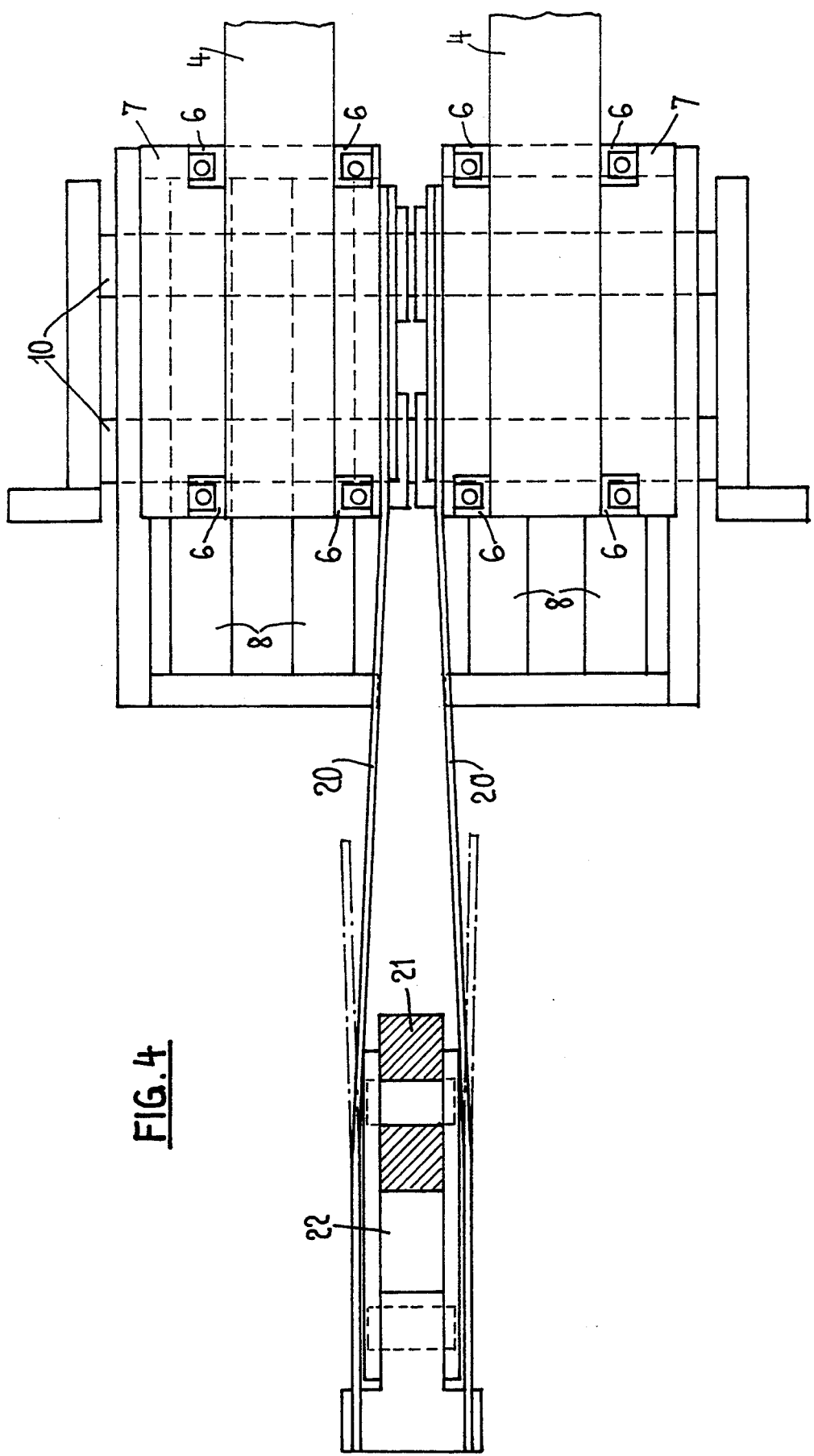

TRANSFER DEVICE IN A PRESS

This application is a continuation of U.S. application Ser. No. 07/804,363 filed Dec. 10, 1991, now abandoned.

The present invention refers to a transfer device in a press, for the stepwise transport of workpieces through the processing stations of a tool, comprising transport bars which are disposed laterally with respect to said tool and which are provided with grippers for said workpieces and are displaceable longitudinally and transversally in a reciprocating, cyclic movement. In each working cycle, said transport bars perform a closed rectangular movement by advancing a number of seized workpieces to the following station of the tool in a first step, then being laterally retired from said tool, longitudinally returned, and moved towards said tool again in order to seize the workpieces. In the process, considerable accelerations and decelerations and correspondingly high forces of inertia will result, so that the working cadence of said press is limited by the rigidity and the stability of said transfer device. Relatively narrow limits are thus set since any increase of the rigitiy and of the mechanical deformation stability of the transport bars leads to an increase of weight which in turn results in an increase of the forces of inertia.

It is the object of the present invention to provide a transfer device allowing sufficient stability with a relatively modest weight, and thus relatively high working cadences. A first contribution to the solution of the exposed problem is given by a transfer device wherein said transport bars are constrained at their ends and rigidly guided longitudinally and transversally. It has been found that transport bars which are constrained at their ends and rigidly guided longitudinally and transversally are particularly stable with respect to deformations and thus can be subjected to comparatively higher accelerations. Thus, the transfer device of the present invention includes a transfer device for a press, for the stepwise transport of a workpiece through processing stations of a tool of the press, the press having a slide supporting at least part of the tool and columns for supporting and guiding the slide, the transfer device comprising: a plurality of transport bars having first and second ends disposed laterally with respect to the tool for transporting the workpiece, the transport bars being displacable longitudinally and transversely in cyclic relation to the reciprocating movement of the press; grippers disposed on the transport bars for gripping the workpiece; guide means for guiding the transport bars longitudinally and transversely; the first and second end of the transport bars being rigidly connected to the guide means, and driving means for driving the transport bars longitudinally and transversely thereby advancing the workpiece. Further, the transfer may include transport bars which are hollow profiles, preferably square hollow profiles. Since the grippers serving for the transport of the workpieces are generally not symmetrically attached to the transport bars, not only bending and shearing stresses but also torsional stresses result in these bars. Due to the use of hollow profiles, preferably square hollow profiles, for said transport bars, said stresses can be absorbed without the need for said transport bars to have an excessive weight.

The invention is explained in more detail hereinafter with reference to an embodiment which is illustrated in the drawing.

FIG. 4 Shows a part of the drive of the transfer device.

Figure 1:
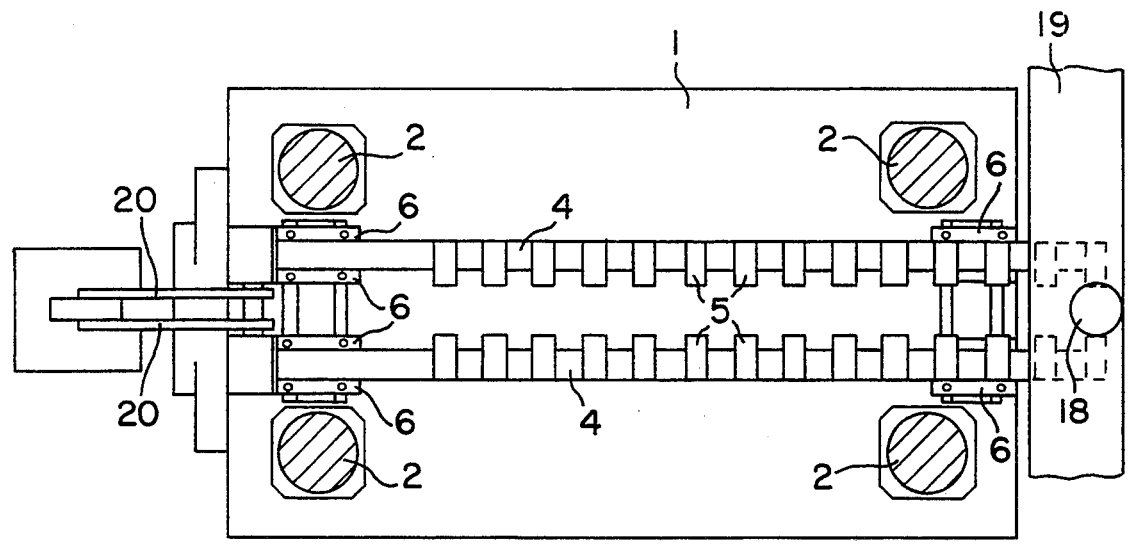
FIG. 1 is a plan view of the press bed and the transfer device.
Figure 2:
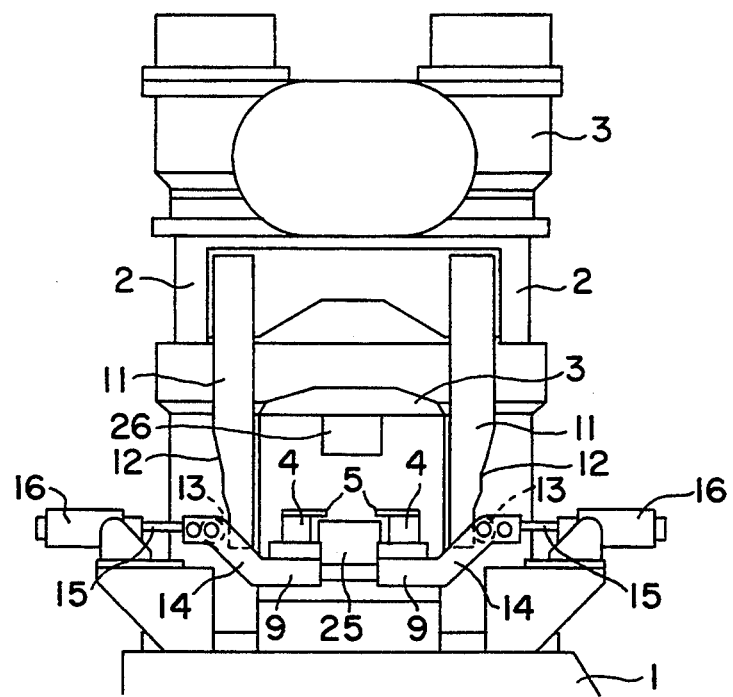
FIG. 2 is a front view of the press including parts of the transfer device.
Figure 3:
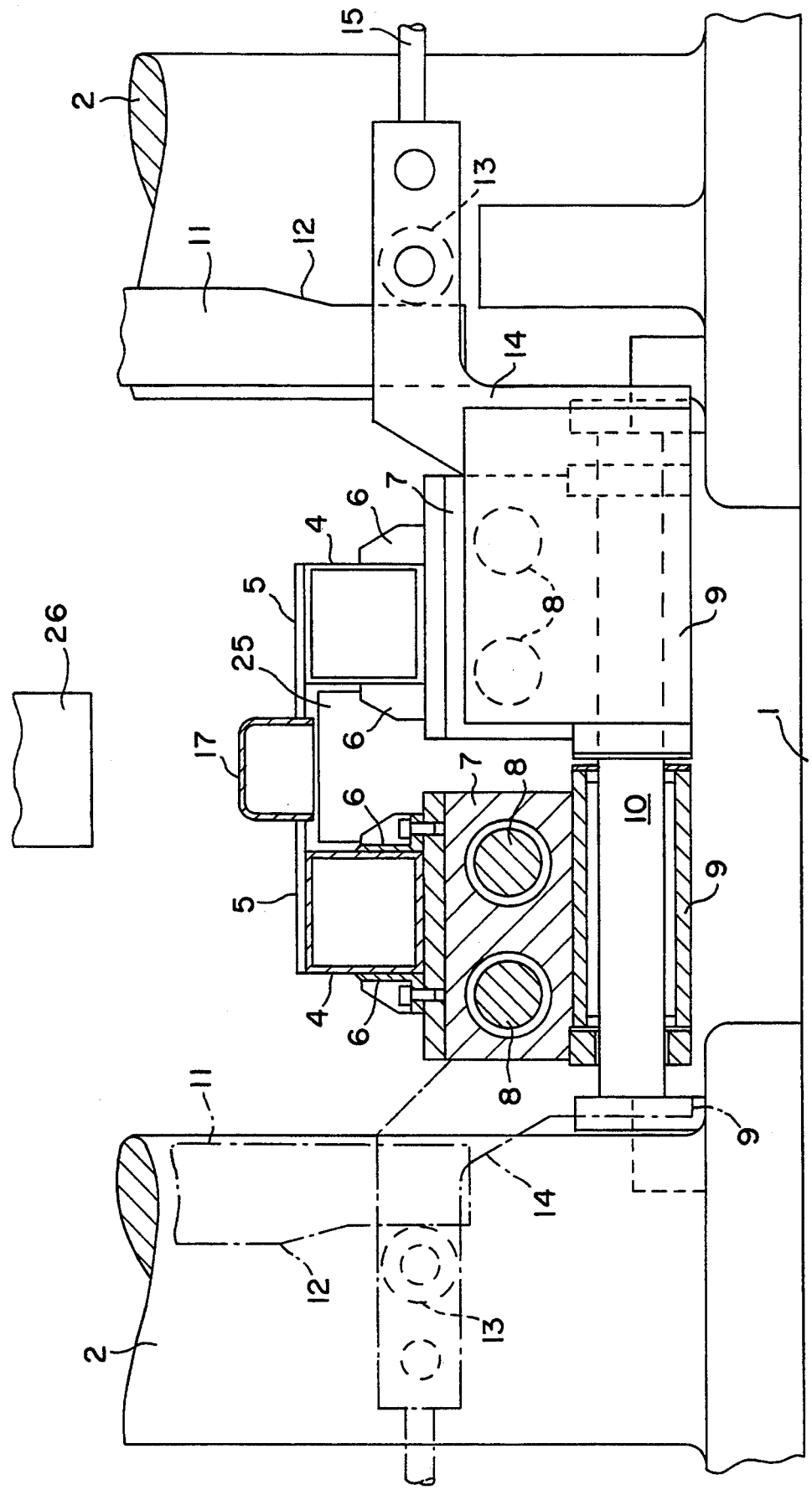
FIG. 3 is a partial section according to line III—III of FIG. 1 on an enlarged scale.

In a more or less schematical manner, FIGS. 1 and 2 show a press bed 1, guiding columns 2, and a press slide 3. As is common practice, the lower portion of a transfer tool 25 comprising a plurality of processing stations is secured to the press bed 1 and the upper portion 26 to slide 3. Said tool is schematically represented in the drawing for the sake of simplicity. On either side of said tool, a respective transport bar 4 having purely schematically illustrated grippers 5 for workpieces is provided. As shown particularly in FIG. 3, said transport bars 4 consist of square hollow profiles which with respect to their weight have a high bending and torsional rigidity. Grippers 5 are fitted on the upper side of transport bars 4, i.e. asymmetrically with respect to the profile of said bars, so that transport bars 4, as mentioned, are also subject to torsional stresses in operation. Between the guiding columns 2, i.e. in the longitudinal direction of transport bars 4, and at some distance outside said guiding columns, the ends of said transport bars are welded to angle brackets 6 which in turn are fixedly screwed to longitudinal slides 7. Said longitudinal slides 7 (FIG. 3) are fixedly guided along two parallel-guiding bars 8 which are mounted in a transversal slide 9 which is guided along two parallel transversal guiding bars 10. The ends of transport bars 4 are thus rigidly constrained and guided, which, together with the high rigidity of the transport bars themselves, leads to a very high stability, i.e. to low deformations of the transport bars under the above-mentioned forces of inertia. As a result, it is possible to work at comparatively very high working cadences of e.g. up to 300/min without prejudice to the safety in operation or to the lifetime of the guidings and the drive.

The transversal movement of the transport bars 4 is controlled by control rails 11 which are mounted on press slide 3 and which, by means of external control cams 12, act upon control rollers 13 of projections 14 on slides 9. The piston rods 15 of pneumatic cylinders 16 also act upon projections 14. A reliable, constant inward pressure is thus applied to projections 14, so that control rollers 13 are always safely pressed against control cams 12 of control rails 13. It appears in FIGS. 2 and 3 that during the downward movement of control rails 11 together with press slide 3, control rollers 13 and the parts which are connected thereto, i.e. also transport bars 4, are spread apart in such a manner that a workpiece 17 which is clamped between two opposite grippers 5 will be released. Meanwhile, grippers 5 are also laterally removed from the range of the two tool portions, so that the tool is allowed to close in all stations for the processing of workpieces. It is indicated in FIG. 1 that blanks 18 are cut from a transversally advancing strip 19 at a determined location and are received by the outermost grippers of transport bars 4.

The longitudinal advance of transport bars 4 is effected by means of two leaf springs 20 which are secured to the inner side of longitudinal slides 7 and are driven by a drive lever 21 via coupling lever 22. Leaf springs 20 are rigid enough to drive transport bars 4 in the longitudinal direction, but they are capable of following the transversal movements of transport bars 4, as is indicated in FIG. 4. It will be noted that the embodiment of the longitudinal drive according to FIG. 4 deviates somewhat from that which is illustrated purely schematically in FIG. 1.

As already mentioned, the two transport bars 4 perform very fast movements in the longitudinal and the tranversal directions in operation, considerable forces of inertia resulting in the bars during the transversal movements, which result in bending and torsional stresses of said bars. Due to the guiding of the bar ends according to the invention, which is free of play and thus rigid, said bar ends are substantially rigidly constrained, and are thus not exposed to any bending or pivotment in their mountings. It has been found that the bending of the transport bars is thus quite considerably reduced. Accordingly, considerably higher stresses, i.e. higher working cadences are possible under given requirements as to the precision of the respective positions of the workpiece grippers. On the other hand, the high rigidity of light-weight transport bars 4 contributes to an extraordinary rigidity of the entire arrangement, thus allowing high working cadences. Nevertheless, the forces of inertia are limited because the total weight of the moving parts is relatively low.

We claim:

1. In a press having a transfer device for the stepwise transport of a workpiece through processing stations of a tool of the press, the press having a slide supporting at least part of the tool and columns for supporting and guiding the slide, the improvement wherein the transfer device comprises:

a plurality of transport bars having first and second ends disposed laterally with respect to said tool for transporting said workpiece, said transport bars being displacable longitudinally and transversely only in cyclic relation to the reciprocating movement of the press;

grippers disposed on said transport bars for gripping said workpiece;

guide means for guiding said transport bars longitudinally and transversely, said first and second ends of said transport bars being directly and rigidly connected to said guide means, and first and second driving means for driving said transport bars longitudinally and transversely, respectively thereby advancing the workpiece, said first driving means connected to and acting upon said first end of said transport bars only;

wherein said first driving means includes leaf springs to commonly drive said transport bars longitudinally.

2. In a press having a transfer device for the stepwise transport of a workpiece through processing stations of a tool of the press, the press having a slide supporting at least part of the tool and columns for supporting and guiding the slide, the improvement wherein the transfer device comprises:

a plurality of transport bars having first and second ends disposed laterally with respect to said tool for transporting said workpiece, said transport bars being displacable longitudinally and transversely in cyclic relation to the reciprocating movement of the press;

grippers disposed on said transport bars for gripping said workpiece;

guide means for guiding said transport bars longitudinally and transversely, said first and second ends of said transport bars being rigidly connected to said guide means;

first driving means for driving said transport bars longitudinally at one end thereof only; and second driving means connected to said slide for driving said transport bars transversely, wherein said second driving means includes pneumatic cylinders and control cams connected to said slide, said pneumatic cylinders operating on said first and second ends of said transport bars through said control cams, whereby upon movement of said slide, said transport bars are capable of being spread apart transversely against the pressure of said pneumatic cylinders by said control cams.

3. The invention according to claim 2, wherein said transport bars have a hollow profile and are of high rigidity.

4. The invention according to claim 2, wherein said first driving means includes leaf springs to commonly drive said transport bars longitudinally.

5. In a press having a transfer device for the stepwise transport of a workpiece through processing stations of a tool of the press, the press having a slide supporting at least part of the tool and columns for supporting and guiding the slide, the improvement wherein the transfer device comprises:

a plurality of hollow and rigid transport bars having first and second ends disposed laterally with respect to said tool for transporting said workpiece, said transport bars being displacable longitudinally and transversely only in cyclic relation to the reciprocating movement of the press;

grippers disposed on said transport bars for gripping said workpiece;

guide means for guiding said transport bars longitudinally and transversely only, said first and second ends of said transport bars being directly and rigidly connected to said guide means for rigidly keeping the ends of said transport bars in a longitudinal direction;

first driving means for longitudinally driving said transport bars at one end thereof only; and second driving means connected to said slide for driving said transport bars in a transverse direction;

wherein said second driving means includes pneumatic cylinders and control cams connected to said slide, said pneumatic cylinders operating on said first and second ends of said transport bars through said control cam, whereby upon movement of said slide, said transport bars are capable of being spread apart transversely against the pressure of said pneumatic cylinders by said control cams.

6. In a press having a transfer device for the stepwise transport of a workpiece through processing stations of a tool of the press, the press having a slide supporting at least part of the tool and columns for supporting and guiding the slide, the improvement wherein the transfer device comprises:

a plurality of hollow and rigid transport bars having first and second ends disposed laterally with respect to said tool for transporting said workpiece, said transport bars being displacable longitudinally and transversely only in cyclic relation to the reciprocating movement of the press;

grippers disposed on said transport bars for gripping said workpiece;

guide means for guiding said transport bars longitudinally and transversely only, said first and second ends of said transport bars being directly and rigidly connected to said guide means for rigidly keeping the ends of said transport bars in a longitudinal direction;

first driving means for longitudinally driving said transport bars at one end thereof only; and second driving means comprising cams connected to said slide for driving said transport bars in a transverse direction;

wherein said first driving means includes leaf springs to commonly drive said transport bars longitudinally.

7. In a press having a transfer device for the stepwise transport of a workpiece through processing stations of a tool of the press, the press having a press slide supporting at least part of the tool and columns for supporting and guiding the slide, the improvement wherein the transfer device comprises:

a plurality of hollow transport bars having first and second ends disposed laterally with respect to said tool for displacable longitudinally and transversely in cyclic relation to the reciprocating movement of the press;

grippers disposed on said transport bars for gripping said workpiece;

guide means for guiding said transport bars, said guide means including longitudinal slides and at least one transversal slide, and pairs of guiding bars upon which each of said longitudinal slides and said at least one transversal slide is guided, each said first and second ends of said transport bars being rigidly connected to one of said longitudinal slides whereby said first and second ends of said transport bars are rigidly guided and constrained by said guide means;

first driving means for driving said transport bars longitudinally at one end thereof only; and second driving means for driving said transport bars transversely, said second driving means including control cams connected to said press slide, a control member in driving connection with each end of said transport bars, and pressure means connected to each of said control members for urging each control member against one of said control cams and thereby driving said transport bars transversely.

8. The invention according to claim 7, wherein said transport bars have a square profile.

9. The invention according to claim 7, wherein said first driving means includes leaf springs to commonly drive said transport bars longitudinally.

* * * * *